US011650992B1

(12) United States Patent
Pereira (10) Patent No.: US 11,650,992 B1
(45) Date of Patent: May 16, 2023

(54) METHOD AND SYSTEM FOR SCALING QUERY PROCESSES ELASTICALLY

(71) Applicant: WizRocket Inc., Mountain View, CA (US)

(72) Inventor: Francis Pereira, Powai (IN)

(73) Assignee: WizRocket Inc., Mountain View, CA (US)

( * ) Notice: Subject to any disclaimer, the term of this patent is extended or adjusted under 35 U.S.C. 154(b) by 0 days.

(21) Appl. No.: 17/644,575

(22) Filed: Dec. 16, 2021

(51) Int. Cl.
*G06F 15/16* (2006.01)
*G06F 16/2455* (2019.01)
*G06F 16/21* (2019.01)
*G06F 16/2453* (2019.01)

(52) U.S. Cl.
CPC ........ *G06F 16/24561* (2019.01); *G06F 16/21* (2019.01); *G06F 16/24532* (2019.01); *G06F 16/24552* (2019.01)

(58) Field of Classification Search
None
See application file for complete search history.

(56) References Cited

U.S. PATENT DOCUMENTS

| 2012/0136850 A1* | 5/2012 | Barsness | G06F 16/24547 707/720 |
| 2021/0034598 A1* | 2/2021 | Arye | G06F 16/288 |
| 2021/0109974 A1* | 4/2021 | Shekhar | G06F 3/064 |

* cited by examiner

*Primary Examiner* — Alex Gofman
(74) *Attorney, Agent, or Firm* — Kolisch Hartwell, P.C.

(57) ABSTRACT

The present disclosure provides a system for performing a method for scaling one or more query processes elastically. The method includes a first step of receiving a request for running the one or more query processes concurrently. In addition, the method includes another step of pre-determining amount of space required for efficient operation and processing of the one or more query processes. Further, the method includes yet another step of creating one or more virtual spaces in a query space outside the data space for efficient running of the one or more query processes. Furthermore, the method includes yet another step of decompressing compressed data stored in the one or more memory regions of the data space requested by the one or more query processes. Moreover, the method includes yet another step of compressing decompressed data present in the virtual space of the one or more virtual spaces.

12 Claims, 5 Drawing Sheets

METHOD AND SYSTEM FOR SCALING QUERY PROCESSES ELASTICALLY

TECHNICAL FIELD

The present disclosure relates to the field of database management system, and in particular, relates to a method and system for scaling query processes elastically.

INTRODUCTION

Over the past few years, there has been an exponential growth in amount of data generated. The exponential growth in amount of the data generated is due to advent of technologies that use machines to generate and deal with data. Also, the increase in technologies such as Internet of things, Machine learning, Big data and Artificial Intelligence contribute hugely on generation of large amount of the data. In addition, big data ecosystem includes databases. For example, databases include MySQL, Oracle databases, and cloud computing databases such as AWS. The databases store actively or passively generated data, including machine data. The machine data includes performance data, diagnostic data or any other data. The databases are usually managed using a database management system (DBMS). Conventionally, a DBMS has a client side and a server side. The client side is where applications or users submit their queries. Moreover, a server side is where the queries are executed.

SUMMARY

In a first example, a computer-implemented method is provided. The computer-implemented method for scaling one or more query processes elastically. The computer-implemented method includes a first step of receiving a request for running the one or more query processes concurrently. In addition, the computer-implemented method includes another step of pre-determining amount of space required for efficient operation and processing of the one or more query processes. Further, the computer-implemented method includes yet another step of creating one or more virtual spaces in a query space outside the data space for efficient running of the one or more query processes. Furthermore, the computer-implemented method includes yet another step of decompressing compressed data stored in the one or more memory regions of the data space requested by the one or more query processes. Moreover, the computer-implemented method includes yet another step of compressing decompressed data present in the virtual space of the one or more virtual spaces. The query process isolation system searches for one or more memory regions in data space that stores data requested by the one or more query processes. The query process isolation system searches for the one or more memory regions upon receiving the request for the one or more query processes. The pre-determination of the amount of space is performed based on size of data requested by the one or more query processes. The pre-determination of the amount of space is performed for decompressing the data stored in the one or more memory regions of the data space. Each of the one or more virtual spaces allows efficient operation and running of each of the one or more query processes based on determination of the amount of space required for each of the one or more query processes. The decompression is performed after moving the compressed data stored in the one or more memory regions of the data space to a virtual space of the one or more virtual spaces isolated from the data space. The one or more virtual spaces enable decompression of the compressed data to perform one or more computing operations. The compression is performed for moving the decompressed data present in the virtual space of the one or more virtual spaces back in the one or more memory regions of the data space. The compressed data is moved back after efficient operation and running of the one or more query processes.

In an embodiment of the present disclosure, compression of the data is performed using one or more compression techniques. The one or more compression techniques include at least one of block compression, dictionary encoding and enumeration.

In an embodiment of the present disclosure, the query process isolation system enables isolation between the one or more query processes and the data space.

In an embodiment of the present disclosure, the one or more computing operations includes at least one of inputting, outputting, processing, storing, and controlling.

In a second example, a computer system is provided. The computer system includes one or more processors and a memory. The memory is coupled to the one or more processors. The instructions cause the one or more processors to perform a method for scaling one or more query processes elastically. The method includes a first step of receiving a request for running the one or more query processes concurrently. In addition, the method includes another step of pre-determining amount of space required for efficient operation and processing of the one or more query processes. Further, the method includes yet another step of creating one or more virtual spaces in a query space outside the data space for efficient running of the one or more query processes. Furthermore, the method includes yet another step of decompressing compressed data stored in the one or more memory regions of the data space requested by the one or more query processes. Moreover, the method includes yet another step of compressing decompressed data present in the virtual space of the one or more virtual spaces. The query process isolation system searches for one or more memory regions in data space that stores data requested by the one or more query processes. The query process isolation system searches for the one or more memory regions upon receiving the request for the one or more query processes. The pre-determination of the amount of space is performed based on size of data requested by the one or more query processes. The pre-determination of the amount of space is performed for decompressing the data stored in the one or more memory regions of the data space. Each of the one or more virtual spaces allows efficient operation and running of each of the one or more query processes based on determination of the amount of space required for each of the one or more query processes. The decompression is performed after moving the compressed data stored in the one or more memory regions of the data space to a virtual space of the one or more virtual spaces isolated from the data space. The one or more virtual spaces enable decompression of the compressed data to perform the one or more computing operations. The compression is performed for moving the decompressed data present in the virtual space of the one or more virtual spaces back in the one or more memory regions of the data space. The compressed data is moved back after efficient operation and running of the one or more query processes.

In an embodiment of the present disclosure, compression of the data is performed using one or more compression techniques. The one or more compression techniques include at least one of block compression, dictionary encoding and enumeration.

In an embodiment of the present disclosure, the query process isolation system enables isolation between the one or more query processes and the data space.

In an embodiment of the present disclosure, the one or more computing operations includes at least one of inputting, outputting, processing, storing, and controlling.

In a third example, a non-transitory computer-readable storage medium is provided. The non-transitory computer-readable storage medium encodes computer executable instructions that, when executed by at least one processor, performs a method. The method for scaling one or more query processes elastically. The method includes a first step of receiving a request for running the one or more query processes concurrently. In addition, the method includes another step of pre-determining amount of space required for efficient operation and processing of the one or more query processes. Further, the method includes yet another step of creating one or more virtual spaces in a query space outside the data space for efficient running of the one or more query processes. Furthermore, the method includes yet another step of decompressing compressed data stored in the one or more memory regions of the data space requested by the one or more query processes. Moreover, the method includes yet another step of compressing decompressed data present in the virtual space of the one or more virtual spaces. The query process isolation system searches for one or more memory regions in data space that stores data requested by the one or more query processes. The query process isolation system searches for the one or more memory regions upon receiving the request for the one or more query processes. The pre-determination of the amount of space is performed based on size of data requested by the one or more query processes. The pre-determination of the amount of space is performed for decompressing the data stored in the one or more memory regions of the data space. Each of the one or more virtual spaces allows efficient operation and running of each of the one or more query processes based on determination of the amount of space required for each of the one or more query processes. The decompression is performed after moving the compressed data stored in the one or more memory regions of the data space to a virtual space of the one or more virtual spaces isolated from the data space. The one or more virtual spaces enable decompression of the compressed data to perform the one or more computing operations. The compression is performed for moving the decompressed data present in the virtual space of the one or more virtual spaces back in the one or more memory regions of the data space. The compressed data is moved back after efficient operation and running of the one or more query processes.

In an embodiment of the present disclosure, compression of the data is performed using one or more compression techniques. The one or more compression techniques include at least one of block compression, dictionary encoding and enumeration.

In an embodiment of the present disclosure, the query process isolation system enables isolation between the one or more query processes and the data space.

In an embodiment of the present disclosure, the one or more computing operations includes at least one of inputting, outputting, processing, storing, and controlling.

BRIEF DESCRIPTION OF THE DRAWINGS

Having thus described the invention in general terms, references will now be made to the accompanying figures, wherein:

It should be noted that the accompanying figures are intended to present illustrations of exemplary embodiments of the present disclosure. These figures are not intended to limit the scope of the present disclosure. It should also be noted that accompanying figures are not necessarily drawn to scale.

DETAILED DESCRIPTION

In the following description, for purposes of explanation, numerous specific details are set forth in order to provide a thorough understanding of the present technology. It will be apparent, however, to one skilled in the art that the present technology can be practiced without these specific details. In other instances, structures and devices are shown in block diagram form only in order to avoid obscuring the present technology.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

Figure 1:
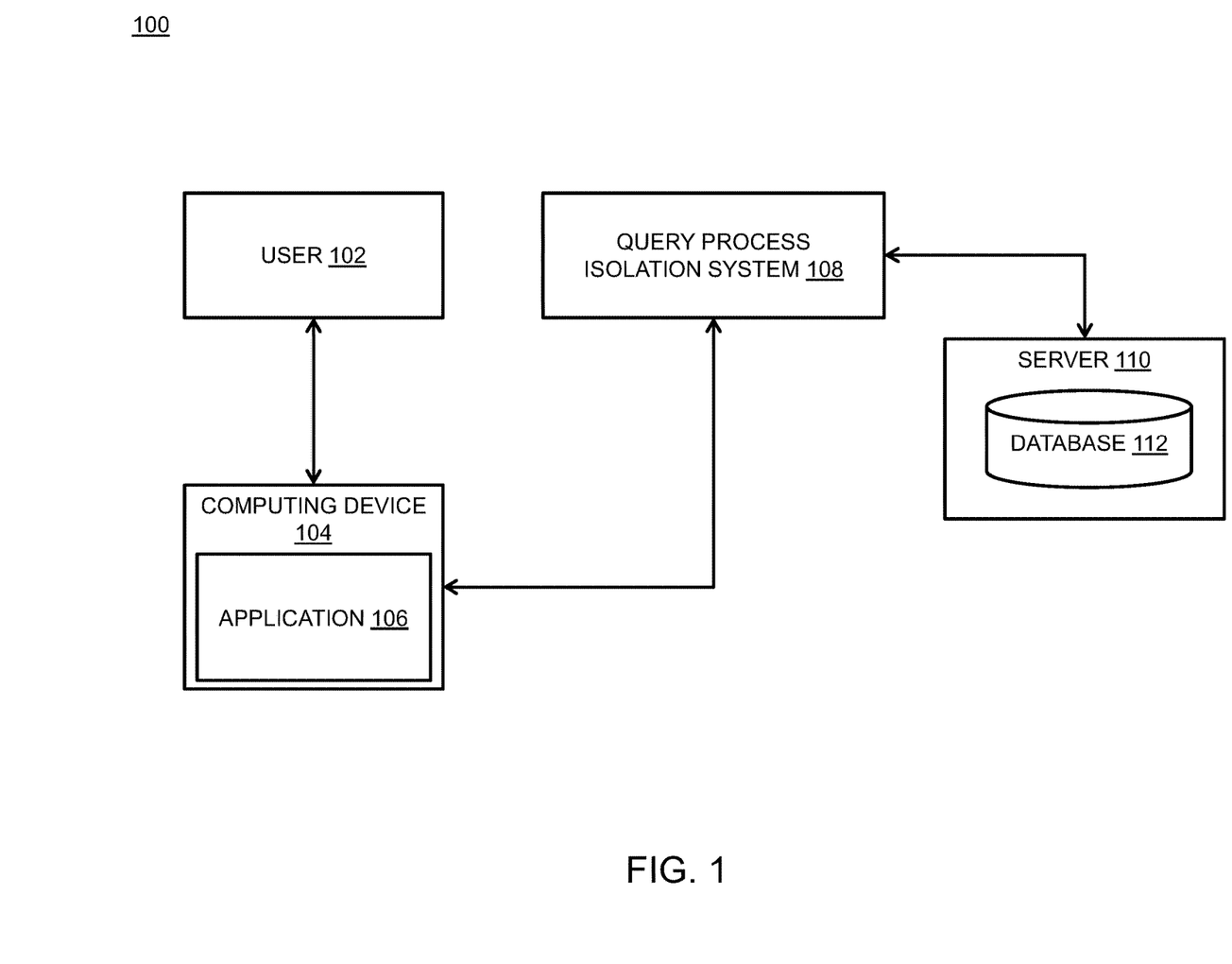
FIG. 1 illustrates an interactive computing environment for a system for scaling of query processes elastically, in accordance with various embodiments of the present disclosure.
Figure 2:
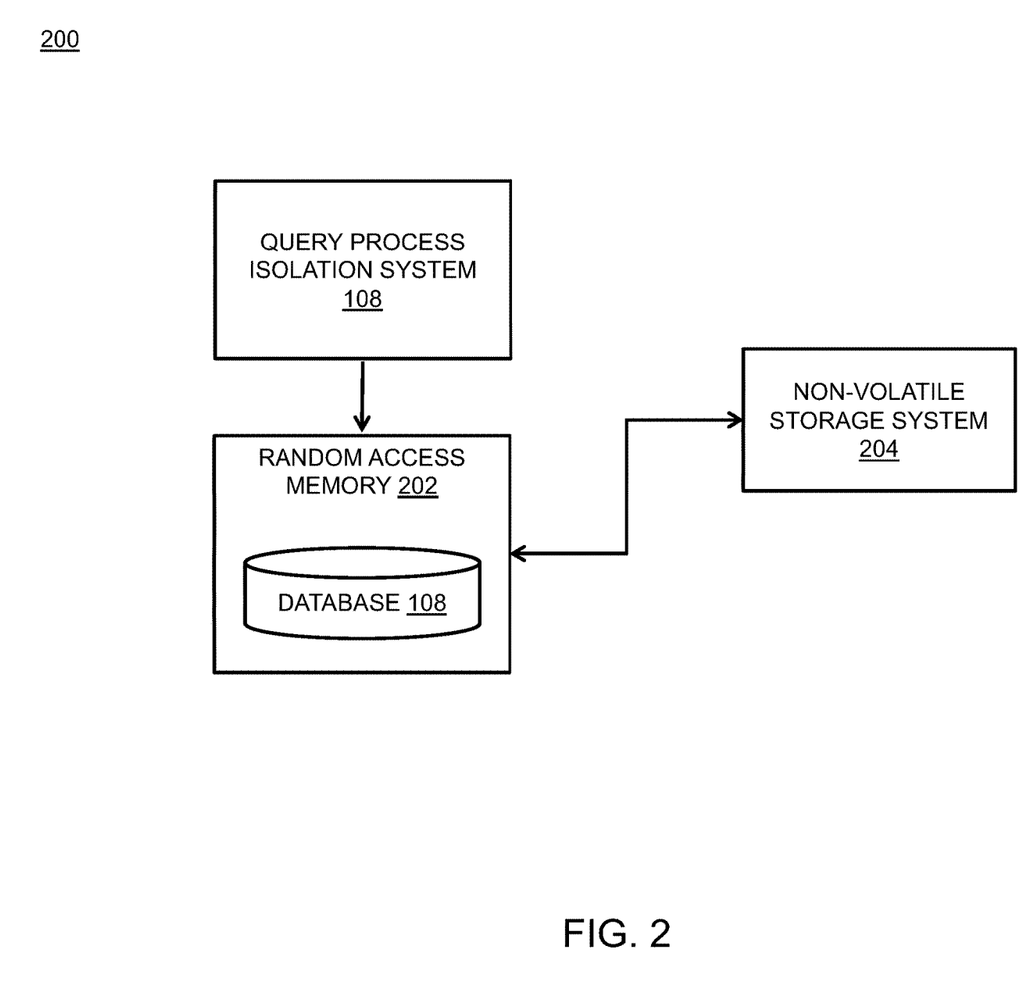
FIG. 2 illustrates a general overview of the system for performing scaling of the query processes elastically, in accordance with various embodiments of the present disclosure.

FIG. 1 illustrates an interactive computing environment 100 for a system for scaling of query processes elastically, in accordance with various embodiments of the present disclosure. FIG. 2 illustrates a general overview of a system 200 for performing scaling of the query processes elastically, in accordance with various embodiments of the present disclosure. The interactive computing environment 100 includes a user 102, a computing device 104, an application 106, and a query process isolation system 108. In addition, the interactive computing environment 100 includes a server 110, and a database 112. The system 200 includes the query process isolation system 108, a random access memory 202, a non-volatile storage system 204, and the database 112. In an embodiment of the present disclosure, the system 200 includes internal components of the computing device 104.

The user 102 is any client, person, business or organization that requires the query process isolation system 108. In an embodiment of the present disclosure, the user 102 is a client with requirement to scale query processes elastically in their computing system. In another embodiment of the present disclosure, the user 102 is any business that requires complete isolation between query processes and data processes in their computing system for handling multiple query processes concurrently. In yet another embodiment of the present disclosure, the client is an organization that wants to utilize the query process isolation system 108. In an embodiment of the present disclosure, the user 102 is capable to operate the computing device 104. In another embodiment of the present disclosure, the user 102 specifies their requirement to the query process isolation system 108.

The interactive computing environment 100 includes the computing device 104. In an embodiment of the present disclosure, the computing device 104 is associated with the user 102. The computing device 104 is any computer system which mainly comprises the random access memory 202, the non-volatile storage system 204, and a display panel. In an embodiment of the present disclosure, the computing device 104 is a portable computer system. In an example, the portable computer system includes laptop, smartphone, tablet, smart watch and the like. In an example, the smartphone is at least one of an Apple smartphone, an Android-based smartphone, a Windows-based smartphone and the like. In another embodiment of the present disclosure, the computing device 104 is a fixed computer system. In an example, the fixed computer system includes a desktop, a workstation PC and the like.

In addition, the computing device 104 requires an operating system to install and load the application 106 in the computing device 104. The operating system is system software that manages hardware and software resources and provides common services for computer programs. In addition, the operating system acts as an interface for the application 106 installed in the computing device 104 to interact with the random access memory 202 or other hardware components of the computing device 104. In an embodiment of the present disclosure, the operating system installed in the computing device 104 is a mobile operating system. In another embodiment of the present disclosure, the computing device 104 runs on any suitable operating system designed for the portable computer system. In an example, the mobile operating system includes but may not be limited to Windows operating system from Microsoft, Android operating system from Google, iOS operating system from Apple, Symbian based operating system from Nokia. In an embodiment of the present disclosure, the operating system is not limited to the above mentioned operating systems. In addition, the computing device 104 runs on any version of the above mentioned operating systems.

In another embodiment of the present disclosure, the computing device 104 runs on any suitable operating system designed for fixed computer system. In an example, the operating system installed in the computing device 104 is Windows from Microsoft. In another example, the operating system installed in the computing device 104 is Mac from Apple. In yet another example, the operating system installed in the computing device 104 is Linux based operating system. In yet another example, the operating system installed in the computing device 104 may be UNIX, *Kali* Linux, and the like.

In an embodiment of the present disclosure, the computing device 104 runs on any version of Windows operating system. In another embodiment of the present disclosure, the computing device 104 runs on any version of Mac operating system. In another embodiment of the present disclosure, the computing device 104 runs on any version of Linux operating system. In yet another embodiment of the present disclosure, the computing device 104 runs on any version of the above mentioned operating systems.

In an embodiment of the present disclosure, the computing device 104 includes the display panel to interact with the application 106. Also, the computing device 104 includes the display panel to display results fetched from the application 106. In an embodiment of the present disclosure, the computing device 104 includes an advanced vision display panel. The advanced vision display panels include OLED, AMOLED, Super AMOLED, Retina display, Haptic touchscreen display and the like. In another embodiment of the present disclosure, the computing device 104 includes a basic display panel. The basic display panel includes but may not be limited to LCD, IPS-LCD, capacitive touchscreen LCD, resistive touchscreen LCD, TFT-LCD and the like.

The interactive computing environment 100 includes the application 106. The application 106 is installed in the computing device 104. The application 106 is any software code that is basically programmed to interact with hardware elements of the computing device 104. The term hardware elements here refer to a plurality of memory types installed inside the computer system. Moreover, the application 106 is used to access, read, update and modify data stored in hardware elements of the computing device 104. In an embodiment of the present disclosure, the application 106 is any software code that may interact with the random access memory 202 of the computing device 104.

In an embodiment of the present disclosure, the application 106 is a DBMS application. The term DBMS stands for database management system. The DBMS application 106 is software subsystem used for storing, retrieving and manipulating data stored in the database 112. In addition, the data includes records, data pages, data containers, data objects and the like. The database 112 is an organized collection of data. In an example, the application 106 includes MySQL, MS-Access, Oracle Database, BangDB, NoSQL and the like. Also, the application 106 provides a user interface to the user 102 to interact with hardware elements of the computing device 104. In an embodiment of the present disclosure, the user interface includes Graphical User Interface (GUI). In another embodiment of the present disclosure, the user interface includes Application Programming Interface (API). However, the user interface is not limited to above mentioned user interface. The user interface helps to send and receive user commands and data. In addition, the user interface serves to display or return results of operation from the application 106. In an embodiment of the present disclosure, the user interface is part of the application 106.

In an embodiment of the present disclosure, the application 106 is installed at the server 110. In another embodiment of the present disclosure, the application 106 is installed at a plurality of servers. In an example, the plurality of servers may include database server, file server, application server and the like. The plurality of servers communicates with each other using a communication network. The communication network is part of network layer responsible for connection of two or more servers. Further, the communication network may be any type of network. In an embodiment of the present disclosure, the type of communication network is wireless mobile network. In another embodiment of the present disclosure, the type of communication network is wired network with a finite bandwidth. In yet another embodiment of the present disclosure, the type of communication network is combination of wireless and wired network for optimum throughput of data transmission. In yet another embodiment of the present disclosure, the type of communication network is an optical fiber high bandwidth network that enables a high data rate with negligible connection drops.

The interactive computing environment 100 includes the query process isolation system 108. The query process isolation system 108 performs a method to scale one or more query processes elastically. The query process isolation system 108 enables isolation between the one or more query processes and data space. Query Processing is translation of high-level queries into low-level expression. In addition, the query process isolation system 108 enables running of the one or more query processes simultaneously. The query process isolation system 108 receives a request to run the one or more query processes concurrently. The query process isolation system 108 searches for one or more memory regions in data space that stores data requested by the one or more query processes. The query process isolation system 108 searches for the one or more memory regions upon receiving the request for the one or more query processes. In general, data spaces are an abstraction in data management that aims to overcome some of the problems encountered in data integration system.

The query process isolation system 108 pre-determines amount of space required for efficient operation and processing of the one or more query processes. The query process isolation system 108 performs pre-determination of the amount of space based on size of data requested by the one or more query processes. The query process isolation system 108 performs the pre-determination of the amount of space to decompress the data stored in the one or more memory regions of the data space. In addition, memory region is a logical expandable area that is configured with a memory policy.

The query process isolation system 108 creates one or more virtual spaces in a query space outside the data space for efficient running of the one or more query processes. In addition, each of the one or more virtual spaces allows efficient operation and running of each of the one or more query processes based on determination of the amount of space required for each of the one or more query processes. In addition, virtual space is a set of ranges of virtual addresses that an operating system makes available to the one or more query processes.

In an embodiment of the present disclosure, the data is stored in compressed form in the data space. In an embodiment of the present disclosure, the data is stored in compressed form using one or more compression techniques. The query process isolation system 108 decompresses compressed data stored in the one or more memory regions of the data space requested by the one or more query processes. The query process isolation system 108 performs the decompression after moving the compressed data stored in the one or more memory regions of the data space to a virtual space of the one or more virtual spaces isolated from the data space. In addition, decompression is a technique of expanding compressed data back to original size of data. The one or more virtual spaces enable decompression of the compressed data to perform one or more computing operations. Further, the one or more computing operations include at least one of inputting, outputting, processing, storing, and controlling.

The query process isolation system 108 compresses decompressed data present in the virtual space of the one or more virtual spaces. The query process isolation system 108 performs the compression to move the decompressed data present in the virtual space of the one or more virtual spaces back in the one or more memory regions of the data space. In addition, compression is a technique used to reduce size of data for efficient storage of data. The compressed data is moved back after efficient operation and running of the one or more query processes. The query process isolation system 108 performs compression of the data using one or more compression techniques. The one or more compression techniques include at least one of block compression, dictionary encoding and enumeration. In addition, block compression is a texture compression technique used to reduce texture size. Further, dictionary compression is a lossless compression technique that encodes variable length strings of symbols as single tokens. Furthermore, enumeration is a lossless compression technique that achieves good compression.

The system 200 includes the random access memory 202. The random access memory 202 is form of data storage that stores data and machine code currently in use. The random access memory 202 allows data to be read or written in almost same amount of time irrespective of physical location of data inside the random access memory 202. The random access memory 202 is faster in speed than a solid state drive or the hard disk drive. The random access memory 202 installed inside the computing device 104 is of any suitable size based on requirement of the user 102. In an example, the random access memory 202 is of 8 GB. In another example, the random access memory 202 is of 16 GB. In yet another example, the random access memory 202 is of 32 GB.

The system 200 includes the non-volatile storage system 204. The random access memory 202 is connected to the non-volatile storage system 204. In addition, the non-volatile storage system 204 stores data even after power failure or shutdown of the system. In an example, the non-volatile storage system 204 includes but may not be limited to the hard disk drive, the solid state drive and the optical drives.

The query process isolation system 108 is associated with the server 110. The server 110 is a computer program or device that provides functionality to other programs or devices. The server 110 provides various functionalities, such as sharing data or resources among multiple clients, or performing computation for a client or the user 102. It is shown in FIG. 1 that the query process isolation system 108 is connected with the single server 110; however, those skilled in the art would appreciate that the query process isolation system 108 may be connected to more number of servers.

The server 110 includes the database 112. In an embodiment of the present disclosure, the random access memory 202 includes the database 112. The database 112 present inside the random access memory 202 is an IMDB. The term IMDB stands for in-memory database. The IMDB is a database whose data is stored in main memory to facilitate faster response times. The database 112 stores different sets of information associated with various components of the query process isolation system 108. The database 112 is used to store general information and specialized data. The database 112 organizes data using models such as relational models or hierarchical models. In addition, the database 112 stores data provided by the administrator. It is shown in FIG. 1 that the query process isolation system 108 is connected with the single database 112. However, those skilled in the art would appreciate that the query process isolation system 108 may be connected to more number of databases.

Figure 3:
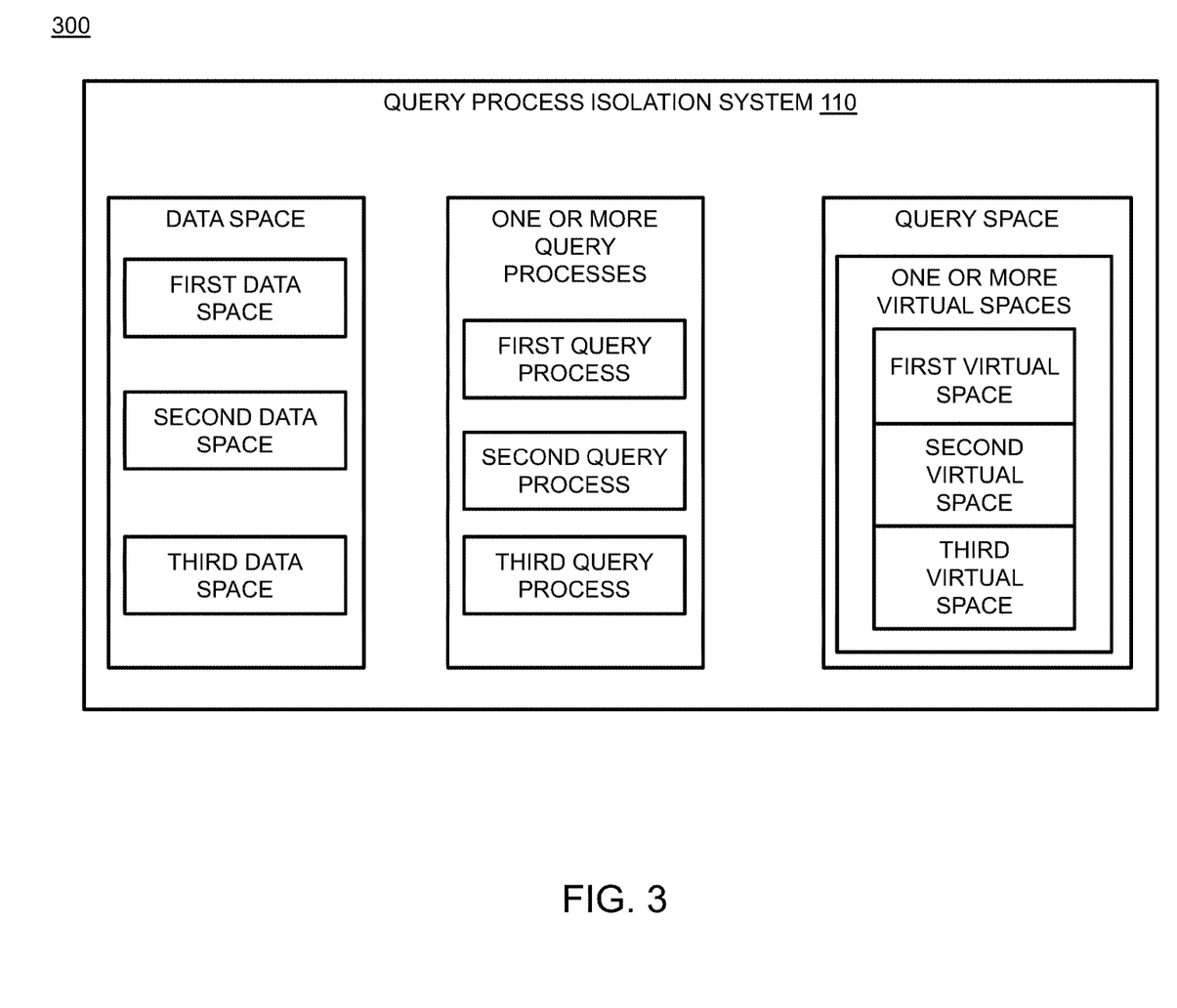
FIG. 3 illustrates an exemplary block diagram of a method for scaling for query processes elastically, in accordance with various embodiments of the present disclosure.

FIG. 3 illustrates an exemplary block diagram 300 of a method for scaling for query processes elastically, in accordance with various embodiments of the present disclosure. The query process isolation system 108 includes the data space, the query space and the one or more query processes. The data space includes a first data space, a second data space, and a third data space. The query space includes one or more virtual spaces. The one or more virtual spaces include a first virtual space, a second virtual space, and a third virtual space. The one or more query processes include a first query process, a second query process, and a third query process.

The query process isolation system 108 receives the request to run the one or more query processes concurrently. The query process isolation system 108 receives a first request for a first query process. In addition, the query process isolation system 108 receives a second request for a second query process. Further, the query process isolation system 108 receives a third request for a third query process. Furthermore, the query process isolation system 108 pre-determines amount of space required for efficient operation and processing of each of the one or more query processes.

The query process isolation system 108 creates the one or more virtual spaces in the query space isolated from the data space. The query process isolation system 108 creates the first virtual space for efficient running of the first query process. The query process isolation system 108 creates the second virtual space for efficient running of the second query process. The query process isolation system 108 creates the third virtual space for efficient running of the third query process.

The first data space stores data required by the first query process. In addition, the second data space stores data required by the second query process. Further, the third data space stores data required by the third query process. The query process isolation system 108 moves data stored in the first data space to the first virtual space. Furthermore, the query process isolation system 108 decompresses compressed data stored in the first data space inside the first virtual space. Moreover, the query process isolation system 108 performs the one or more computing operations on data. Also, the query process isolation system 108 compresses decompressed data after performing the one or more computing operations to store data back inside the first data space.

The query process isolation system 108 moves data stored in the second data space to the second virtual space. Furthermore, the query process isolation system 108 decompresses compressed data stored in the second data space inside the second virtual space. Moreover, the query process isolation system 108 performs the one or more computing operations on data. Also, the query process isolation system 108 compresses decompressed data after performing the one or more computing operations to store data back inside the second data space.

The query process isolation system 108 moves data stored in the third data space to the third virtual space. Furthermore, the query process isolation system 108 decompresses compressed data stored in the third data space inside the third virtual space. Moreover, the query process isolation system 108 performs the one or more computing operations on data. Also, the query process isolation system 108 compresses decompressed data after performing the one or more computing operations to store data back inside the third data space.

Figure 4:
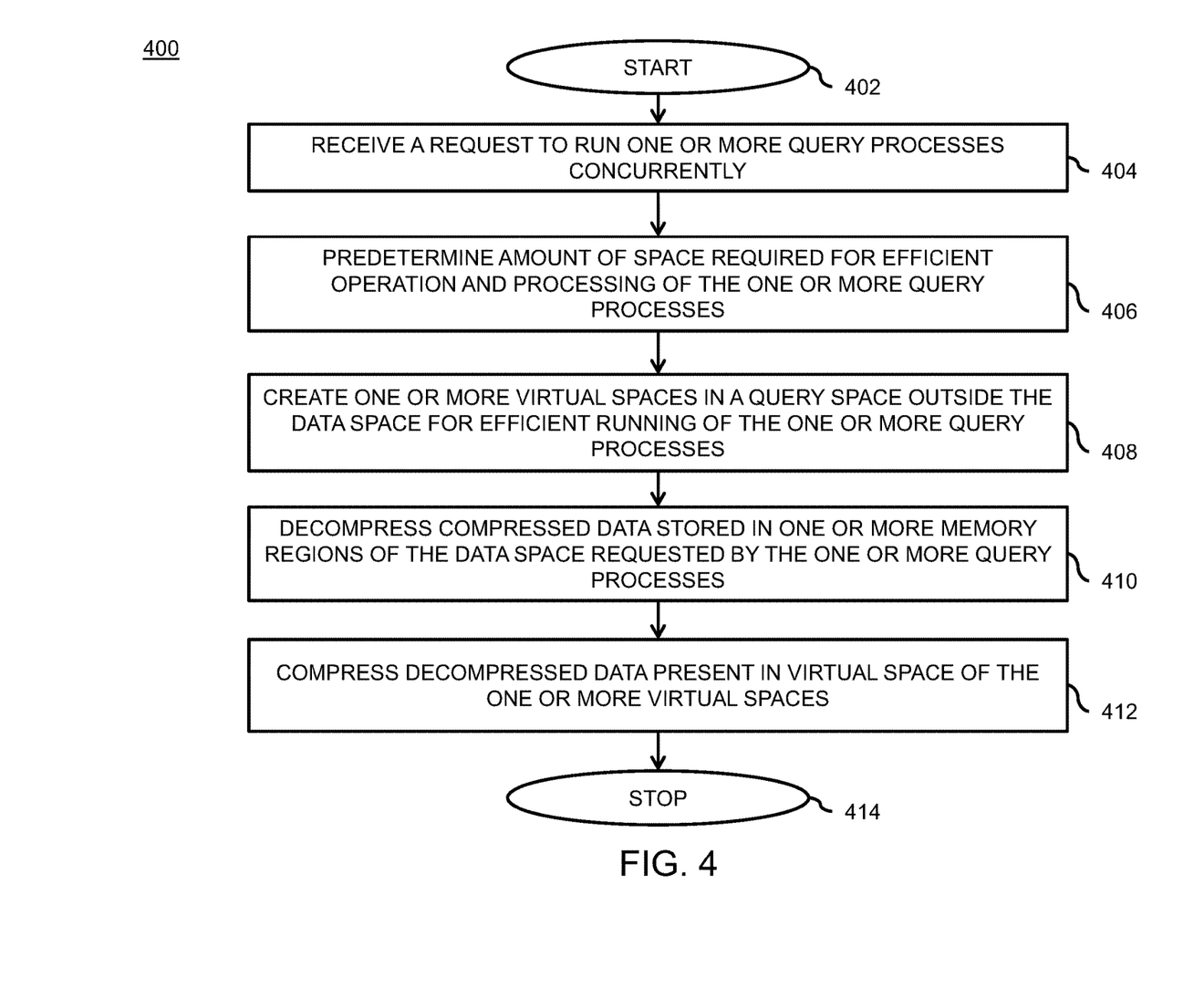
FIG. 4 illustrates a flow chart of a method for scaling of the query processes elastically, in accordance with various embodiments of the present disclosure.

FIG. 4 illustrates a flow chart of a method for scaling of query processes elastically, in accordance with various embodiments of the present disclosure. It may be noted that to explain the process steps of flowchart 400, references will be made to the system elements of FIG. 1 and FIG. 2.

The flowchart 400 initiates at step 402. Following step 402, at step 404, the query process isolation system 108 receives the request to run the one or more query processes concurrently. In addition, at step 406, the query process isolation system 108 pre-determines the amount of space required for efficient operation and processing of the one or more query processes. Further, at step 408, the query process isolation system 108 creates the one or more virtual spaces in the query space outside the data space for efficient running of the one or more query processes. Furthermore, at step 410, the query process isolation system 108 decompresses compressed data stored in the one or more memory regions of the data space requested by the one or more query processes. Moreover, at step 412, the query process isolation system 108 compresses the decompressed data present in the virtual space of the one or more virtual spaces. The flowchart 400 terminates at step 414.

Figure 5:
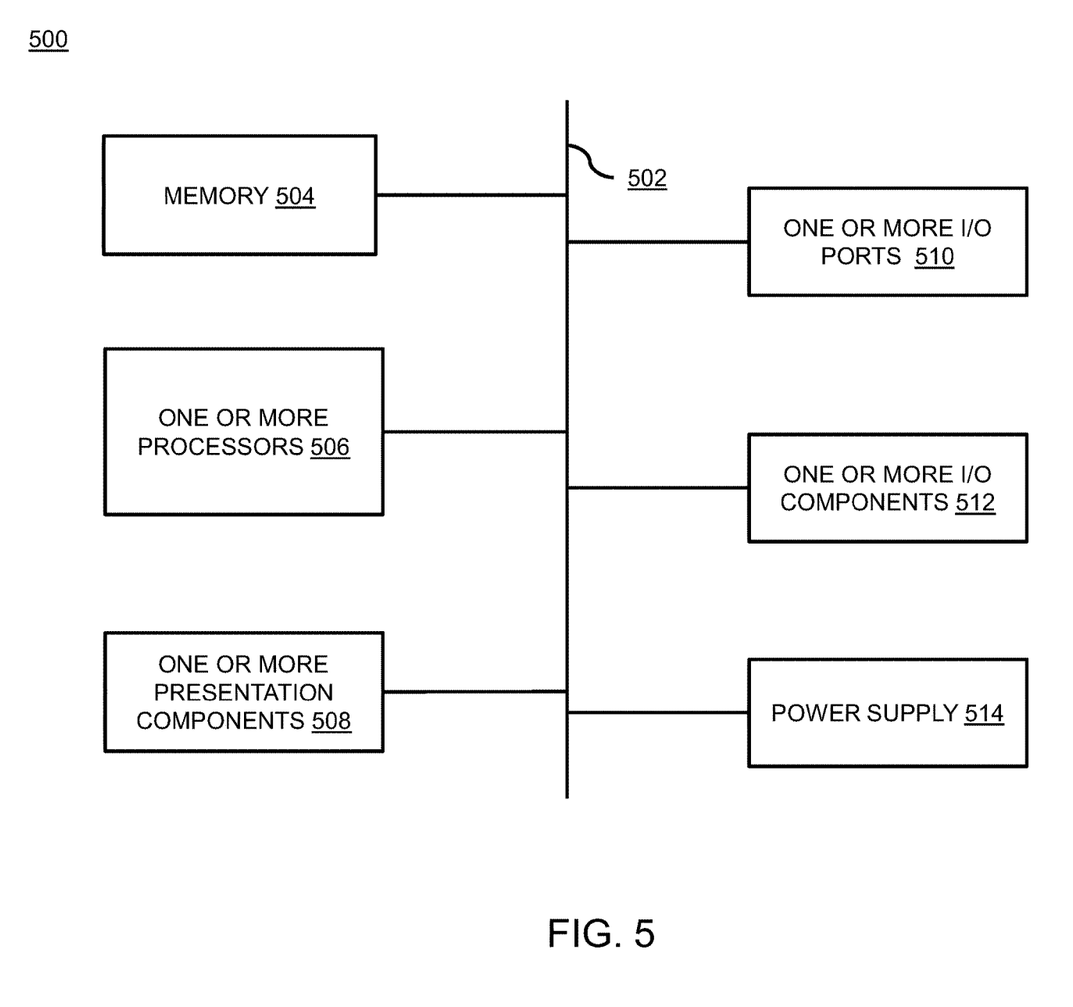
FIG. 5 illustrates a block diagram of a computing device, in accordance with various embodiments of the present disclosure.

FIG. 5 illustrates the block diagram of a computing device 500, in accordance with various embodiments of the present disclosure. The computing device 500 depicts internal components of the computing device 104. The computing device 500 includes a bus 502 that directly or indirectly couples the following devices: memory 504, one or more processors 506, one or more presentation components 508, one or more input/output (I/O) ports 510, one or more input/output components 512, and an illustrative power supply 514. The bus 502 represents what may be one or more busses (such as an address bus, data bus, or combination thereof). Although the various blocks of FIG. 5 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 5 is merely illustrative of an exemplary computing device 500 that can be used in connection with one or more embodiments of the present invention. Distinction is not made between such categories as "workstation," "server," "laptop," "hand-held device," etc., as all are contemplated within the scope of FIG. 5 and reference to "computing device."

The computing device 500 typically includes a variety of computer-readable media. The computer-readable media can be any available media that can be accessed by the computing device 500 and includes both volatile and non-volatile media, removable and non-removable media. By way of example, and not limitation, the computer-readable media may comprise computer storage media and communication media. The computer storage media includes volatile and nonvolatile, removable and non-removable media implemented in any method or technology for storage of information such as computer-readable instructions, data structures, program modules or other data.

The computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 500. The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 504 includes computer-storage media in the form of volatile and/or nonvolatile memory. The memory 504 may be removable, non-removable, or a combination thereof. Exemplary hardware devices include solid-state memory, hard drives, optical-disc drives, etc. The computing device 500 includes one or more processors that read data from various entities such as memory 504 or I/O components 512. The one or more presentation components 508 present data indications to a user or other device. Exemplary presentation components include a display device, speaker, printing component, vibrating component, etc. The one or more I/O ports 510 allow the computing device 500 to be logically coupled to other devices including the one or more I/O components 512, some of which may be built in. Illustrative components include a microphone, joystick, game pad, satellite dish, scanner, printer, wireless device, etc.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

While several possible embodiments of the invention have been described above and illustrated in some cases, it should be interpreted and understood as to have been presented only by way of illustration and example, but not by limitation. Thus, the breadth and scope of a preferred embodiment should not be limited by any of the above-described exemplary embodiments.

What is claimed:

1. A computer-implemented method for scaling one or more query processes elastically, the computer-implemented method comprising:
   receiving, at a query process isolation system with a processor, a request for running the one or more query processes concurrently, wherein the query process isolation system searches for one or more memory regions in data space that stores data requested by the one or more query processes, wherein the query process isolation system searches for the one or more memory regions upon receiving the request for the one or more query processes;
   pre-determining, at the query process isolation system with the processor, amount of space required for efficient operation and processing of the one or more query processes, wherein the pre-determination of the amount of space is performed based on size of data requested by the one or more query processes, wherein the pre-determination of the amount of space is performed for decompressing the data stored in the one or more memory regions of the data space;
   creating, at the query process isolation system with the processor, one or more virtual spaces in a query space outside the data space for efficient running of the one or more query processes, wherein each of the one or more virtual spaces allows efficient operation and running of each of the one or more query processes based on determination of the amount of space required for each of the one or more query processes;
   decompressing, at the query process isolation system with the processor, compressed data stored in the one or more memory regions of the data space requested by the one or more query processes, wherein the decompression is performed after moving the compressed data stored in the one or more memory regions of the data space to a virtual space of the one or more virtual spaces isolated from the data space, wherein the one or more virtual spaces enable decompression of the compressed data to perform one or more computing operations; and
   compressing, at the query process isolation system with the processor, decompressed data present in the virtual space of the one or more virtual spaces, wherein the compression is performed for moving the decompressed data present in the virtual space of the one or more virtual spaces back in the one or more memory regions of the data space, wherein the compressed data is moved back after efficient operation and running of the one or more query processes.

2. The computer-implemented method as recited in claim 1, wherein compression of the data is performed using one or more compression techniques, wherein the one or more compression techniques comprising at least one of block compression, dictionary encoding and enumeration.

3. The computer-implemented method as recited in claim 1, wherein the query process isolation system enables isolation between the one or more query processes and the data space.

4. The computer-implemented method as recited in claim 1, wherein the one or more computing operations comprising at least one of inputting, outputting, processing, storing, and controlling.

5. A computer system comprising:
   one or more processors; and
   a memory coupled to the one or more processors, the memory for storing instructions which, when executed by the one or more processors, cause the one or more processors to perform a method for scaling one or more query processes elastically, the method comprising:
   receiving, at a query process isolation system, a request for running the one or more query processes concurrently, wherein the query process isolation system searches for one or more memory regions in data space that stores data requested by the one or more query processes, wherein the query process isolation system searches for the one or more memory regions upon receiving the request for the one or more query processes;

pre-determining, at the query process isolation system, amount of space required for efficient operation and processing of the one or more query processes, wherein the pre-determination of the amount of space is performed based on size of data requested by the one or more query processes, wherein the pre-determination of the amount of space is performed for decompressing the data stored in the one or more memory regions of the data space;

creating, at the query process isolation system, one or more virtual spaces in a query space outside the data space for efficient running of the one or more query processes, wherein each of the one or more virtual spaces allows efficient operation and running of each of the one or more query processes based on determination of the amount of space required for each of the one or more query processes;

decompressing, at the query process isolation system, compressed data stored in the one or more memory regions of the data space requested by the one or more query processes, wherein the compression is performed for moving the compressed data stored in the one or more memory regions of the data space to a virtual space of the one or more virtual spaces isolated from the data space, wherein the one or more virtual spaces enable decompression of the compressed data to perform one or more computing operations; and compressing, at the query process isolation system, decompressed data present in the virtual space of the one or more virtual spaces, wherein the decompression is performed for moving the decompressed data present in the virtual space of the one or more virtual spaces back in the one or more memory regions of the data space, wherein the decompressed data is moved back after efficient operation and running of the one or more query processes.

6. The computer system as recited in claim 5, wherein compression of the data is performed using one or more compression techniques, wherein the one or more compression techniques comprising at least one of block compression, dictionary encoding and enumeration.

7. The computer system as recited in claim 5, wherein the query process isolation system enables isolation between the one or more query processes and the data space.

8. The computer system as recited in claim 5, wherein the one or more computing operations comprising at least one of inputting, outputting, processing, storing, and controlling.

9. A non-transitory computer-readable storage medium encoding computer executable instructions that, when executed by at least one processor, performs a method for scaling one or more query processes elastically, the method comprising:

receiving, at a computing device, a request for running the one or more query processes concurrently, wherein the query process isolation system searches for one or more memory regions in data space that stores data requested by the one or more query processes, wherein the query process isolation system searches for the one or more memory regions upon receiving the request for the one or more query processes;

pre-determining, at the computing device, amount of space required for efficient operation and processing of the one or more query processes, wherein the pre-determination of the amount of space is performed based on size of data requested by the one or more query processes, wherein the pre-determination of the amount of space is performed for decompressing the data stored in the one or more memory regions of the data space;

creating, at the computing device, one or more virtual spaces in a query space outside the data space for efficient running of the one or more query processes, wherein each of the one or more virtual spaces allows efficient operation and running of each of the one or more query processes based on determination of the amount of space required for each of the one or more query processes;

decompressing, at the computing device, compressed data stored in the one or more memory regions of the data space requested by the one or more query processes, wherein the compression is performed for moving the compressed data stored in the one or more memory regions of the data space to a virtual space of the one or more virtual spaces isolated from the data space, wherein the one or more virtual spaces enable decompression of the compressed data to perform one or more computing operations; and compressing, at the computing device, decompressed data present in the virtual space of the one or more virtual spaces, wherein the decompression is performed for moving the decompressed data present in the virtual space of the one or more virtual spaces back in the one or more memory regions of the data space, wherein the decompressed data is moved back after efficient operation and running of the one or more query processes.

10. The non-transitory computer-readable storage medium as recited in claim 9, wherein compression of the data is performed using one or more compression techniques, wherein the one or more compression techniques comprising at least one of block compression, dictionary encoding and enumeration.

11. The non-transitory computer-readable storage medium as recited in claim 9, wherein the query process isolation system enables isolation between the one or more query processes and the data space.

12. The non-transitory computer-readable storage medium as recited in claim 9, wherein the one or more computing operations comprising at least one of inputting, outputting, processing, storing, and controlling.

* * * * *